United States Patent Office 3,825,572
Patented July 23, 1974

3,825,572
EPIMERIC MIXTURES OF THE LACTONE 3,6-DI-
HYDRO-4,5-DIMETHYL-5-PHENYL-α-PYRONE
John J. van Venrooy, Media, Pa., assignor to Sun
Research and Development Co., Philadelphia, Pa.
No Drawing. Continuation-in-part of application Ser. No.
258,282, May 31, 1972, now Patent No. 3,761,530.
This application Dec. 26, 1972, Ser. No. 318,359
Int. Cl. C07d 7/16
U.S. Cl. 260—343.5          8 Claims

ABSTRACT OF THE DISCLOSURE

Epimeric mixtures of the novel lactone 3,6-dihydro-4,5-dimethyl-5-phenyl-α-pyrone may be prepared by reacting hydratropaldehyde with acetaldehyde or crotonaldehyde. These compounds are useful in V.I. stabilizers in lube oils, and as monomers in the preparation of polyesters. Under certain conditions a by-product comprising a novel linear condensation product, identified as an unsaturated aromatic aldehyde, is also formed. The relative proportions of the novel lactone and unsaturated aromatic aldehydes that are formed may be controlled by varying the ratio of hydratropaldehyde to acetaldehyde. The use of crotonaldehyde instead of acetaldehyde results in the formation of the novel lactone alone.

CROSS-REFERENCE TO RELATED APPLICATION

This application is a continuation-in-part of copending application Ser. No. 258,282, filed May 31, 1972, by John J. van Venrooy, now U.S. Pat. No. 3,761,530.

BACKGROUND OF THE INVENTION

This invention relates to certain novel lactones and their preparation. More particularly, this invention relates to the preparation of an epimeric mixture of 3,6-dihydro-4,5-dimethyl - 5 phenyl-α-pyrones (hereinafter "α-pyrone") by reacting hydratropaldehyde with acetaldehyde or crotonaldehyde in the presence of a base. This invention further relates to the preparation of a novel aromatic aldehyde condensation product formed under certain specified conditions as a by-product of the aforesaid process.

In earlier-filed application, Ser. No. 258,282, filed by John J. van Venrooy on May 31, 1972, now U.S. Pat. No. 3,761,530 and entitled "Preparation of Polycyclic Aromatic Compounds," there is disclosed the reaction of hydratropaldehyde with propionaldehyde, in the presence of a base followed by treatment of the reaction mixture with a halogen acid. In this case, however, the product is a polycyclic 1,3-dimethyl-substituted aromatic hydrocarbon. It is thus quite surprising to find, as in the present process, that when acetaldehyde or crotonaldehyde is substituted for propionaldehyde there is obtained a lactone rather than the corresponding mono-methylated polycyclic-aromatic hydrocarbon.

SUMMARY OF THE INVENTION

Thus, in accordance with the present invention, it has been found that when hydratropaldehyde is reacted with acetaldehyde or crotonaldehyde in the presence of a base, there is formed the lactone, α-pyrone, in accordance with the following equations:

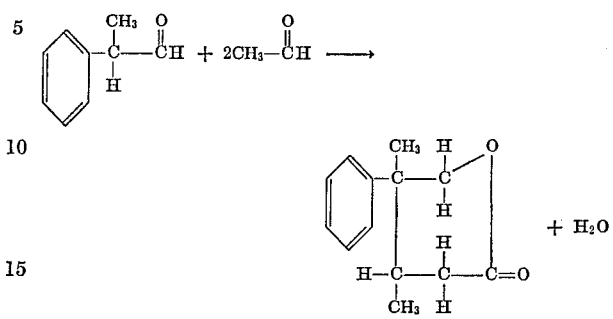

The reaction product, on analysis, is revealed to be a mixture of two epimers. It is theoretically possible for four epimers to be formed but only the two shown below have been isolated. Thus, structural and stereochemical assignments with the aid of Eu(DPM)₃ shift reagent in the NMR study of these materials indicate the two epimers to have the following configurations:

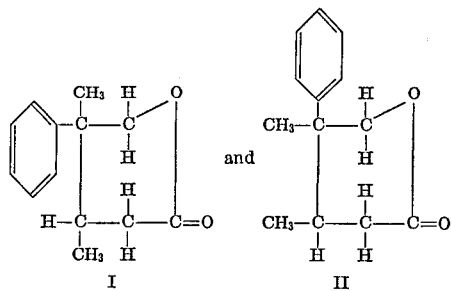

These compounds are useful as V.I. stabilizers in lube oils, and as monomers in the preparation of polyesters.

DESCRIPTION OF THE INVENTION

The reaction is conveniently carried out by heating the hydratropaldehyde with the acetaldehyde or crotonaldehyde in the presence of a base. Although dilute sodium hydroxide (about 1 to 5 percent by weight of the reaction mass) is preferred, other conventional bases of the type employed in an aldol condensation may also be used (e.g. alkali and alkaline earth metal hydroxides and carbonates alkoxides of the alkali and alkaline earth metals and the like). The aldehyde reagents, in an aqueous solution, and catalyst are desirably refluxed for about 0.5 to about 5 hours, preferably, but not essentially, under autogenous pressure.

The novel α-pyrone product is then recovered by conventional procedures, e.g. by ether extraction. The water layer obtained from the extraction step is desirably treated with an acid, e.g. hydrochloric acid, in amounts sufficient to neutralize the base prior to final recovery. Alternatively, the reaction product may be neutralized with acid prior to said ether extraction.

Drying of the ether extract yields a viscous white oil which, on standing, solidifies to provide an epimeric mixture of 3,6-dihydro-4,5-dimethyl-5-phenyl-α-pyrone.

The temperature at which the reaction is preferably carried out is the reflux temperature of the mixture, i.e. at about 95 to 105° C. Preferably, although not essentially, the reaction should be carried out under autogenous pressure to maintain the desired ratio of reactants.

The mole ratio of acetaldehyde to hydrotropaldehyde should desirably be maintained at about at least 1.5 to 2.5 moles of acetaldehyde for each mole of hydratropaldehyde; preferably the mole ratio of these two aldehydes should be about 2:1. The mole ratio of crotonaldehyde to hydratropaldehyde should be in the range of about at least 0.5 to 1.5:1, and preferably 1:1.

When the mole ratio of aldehyde reagent is varied in such a way as to provide amounts of acetaldehyde less than that described above for each mole of hydratropaldehyde, e.g. ratios of about 0.5 to 1.5:1 of acetaldehyde:hydratropaldehyde, there is formed, in addition to the α-pyrone, increasing amounts of the unsaturated aromatic aldehyde condensation product of the formula

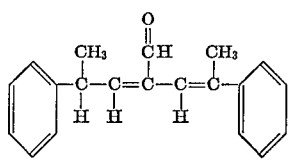

III

This aromatic aldehyde is useful as plasticizers, perfume ingredients, as solvents, in pharmaceuticals and the like.

While the mechanism of the reaction of two moles of acetaldehyde with one mole of hydratropaldehyde to yield the α-pyrone is not known with certainty, it is believed that crotonaldehyde may be formed initially by aldol condensation of two molecules of acetaldehyde. The crotonaldehyde formed in situ then cross condenses with hydratropaldehyde resulting in the formation of the α-pyrone. This is borne out by the facile formation of the α-pyrone directly from crotonaldehyde and hydratropaldehyde.

In order to further illustrate the invention, the following examples are given. In Examples 1 and 2 there are illustrated the formation of the above-described unsaturated aromatic aldehyde as a by-product, concurrent with the formation of the α-pyrone. In the remaining example formation of this by-product is shown to be substantially eliminated by the use of crotonaldehyde instead of acetaldehyde.

Example 1

To a stirred three necked flask equipped with a reflux condenser was charged 350 ml. of water and 10 gms. of sodium hydroxide pellets. Upon dissolution of the sodium hydroxide, 10 gms. of hydratropaldehyde and 3.3 gms. of acetaldehyde were charged to the reactor. The reaction mixture containing acetaldehyde and hydratropaldehyde in a molar ratio of 1:1 was refluxed for two hours at 98 to 100° C. The reaction mixture was extracted with ether, dried over magnesium sulfate and the ether evaporated (the ether-extracted water layer containing the α-pyrone was set aside for further processing); 5.6 gms. of a yellow oil were obtained. Gas chromatography showed this portion to consist of unreacted hydratropaldehyde, a complex high boiling envelope, and a minor peak which has the highest boiling component of the mixture. This component proved to be an unsaturated aromatic aldehyde formed by the condensation of two moles of hydratropaldehyde with one mole of acetaldehyde:

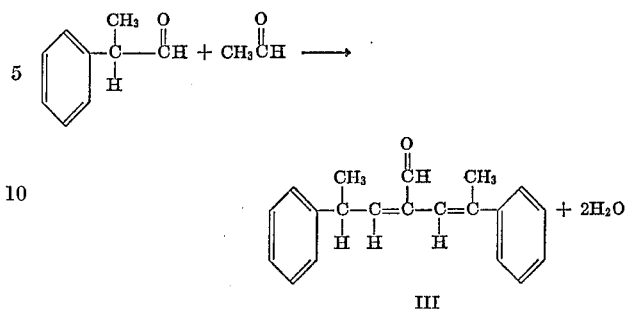

III

The compound $C_{20}H_{20}O$, having a molecular weight of 276, was identified via a combination of infrared and NMR spectroscopy and mass spectrometry. As will be shown in further examples, this linear condensation product may be minimized.

The water layer obtained from the above ether-extraction procedure was neutralized with dilute hydrochloric acid and reextracted a second time with diethylether. After drying the extract over magnesium sulfate and evaporation of the ether, 5.0 gms. of a viscous white oil were obtained which crystallized on standing. This corresponds to a 36 moles percent yield based on the amount of hydratropaldehyde charged. The product consisted of a 1:1 mixture of the two epimers of 3,6-dihydro-4,5-dimethyl-5-phenyl-α-pyrone previously referred to as epimer structures I and II.

Example 2

To a stirred three necked flask equipped with a reflux condenser was charged 350 ml. of water and 10 gms. of sodium hydroxide pellets. Upon dissolution of the sodium hydroxide, 10 gms. of hydratropaldehyde and 8.35 gms. of acetaldehyde were charged to the reactor. The reaction mixture containing acetaldehyde and hydratropaldehyde in a molar ratio of 2.5:1 was processed as in Example 1.

The α-pyrone reaction product amounted to 6.3 gms. which corresponds to a 45 mole percent based on the hydratropaldehyde charged.

Example 3

To a three necked flask equipped as in Example 1 was charged 175 ml. of water containing 5 gms. of dissolved sodium hydroxide, 7.0 gms. of crotonaldehyde and 13.3 gms. of hydratropaldehyde. The reaction mixture containing crotonaldehyde and hydratropaldehyde in a molar ratio of 1:1 was refluxed at 98 to 100° C. for 1½ hours. After cooling, the reaction mixture was neutralized with hydrochloride acid, ether extracted, dried over magnesium sulfate and the ether evaporated. 18.5 gms. of crude product were obtained. Gas chromatographic analysis of the crude product showed it to be 95.7 weight percent of the desired cyclic lactone mixture consisting of the two α-pyrone epimers obtained in Example 1. The ratio of the two epimers was approximately 2:1. The epimer obtained by gas chromatographic separation methods as a solid, M.P. 93° C., occurred in the greater amount.

What is claimed is:

1. Epimeric mixtures of the lactone 3,6-dihydro-4,5-dimethyl-5-phenyl-α-pyrone having the formulas

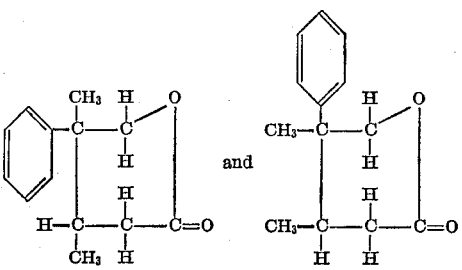

2. 3,6-dihydro-4,5-dimethyl-5-phenyl-α-pyrone having the formula

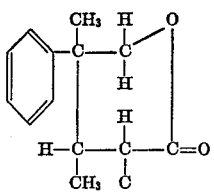

3. 3,6-dihydro-4,5-dimethyl-5-phenyl-α-pyrone having the formula

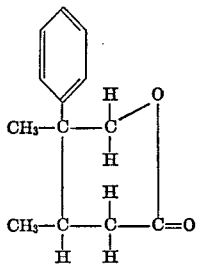

4. A process for the production of an epimeric mixture of 3,6-dihydro-4,5-dimethyl-5-phenyl-α-pyrone having the formulas

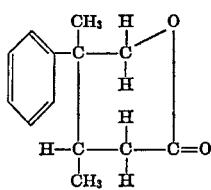 and 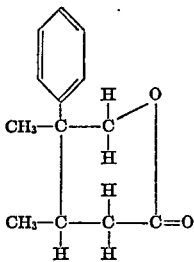

which comprises reacting acetaldehyde or crotonaldehyde with hydratropaldehyde at reflux temperatures in the presence of a base, selected from the group consisting of alkali and alkaline earth metal hydroxides, carbonates and alkoxides wherein the mole ratio of acetaldehyde to hydratropaldehyde is about 1.5–2.5:1, or the mole ratio of crotonaldehyde to hydratropaldehyde is about 0.5–1.5:1, and recovering said α-pyrone.

5. The process according to Claim 4 wherein the mole ratio of acetaldehyde to hydratropaldehyde is about 2:1.

6. The process according to Claim 4 wherein the mole ratio of crotonaldehyde to hydratropaldehyde is about 1:1.

7. The process according to Claim 4 wherein the reaction temperature is from about 95 to 105° C.

8. The process according to Claim 4 wherein the reaction product is neutralized with acid prior to recovery of the α-pyrone.

References Cited
UNITED STATES PATENTS
2,514,325   7/1950   Fried _____ 260—343.5

DONALD G. DAUS, Primary Examiner
A. M. T. TIGHE, Assistant Examiner

U.S. Cl. X.R.
260—78.3 R, 599; 252—52 R